Figure 3:
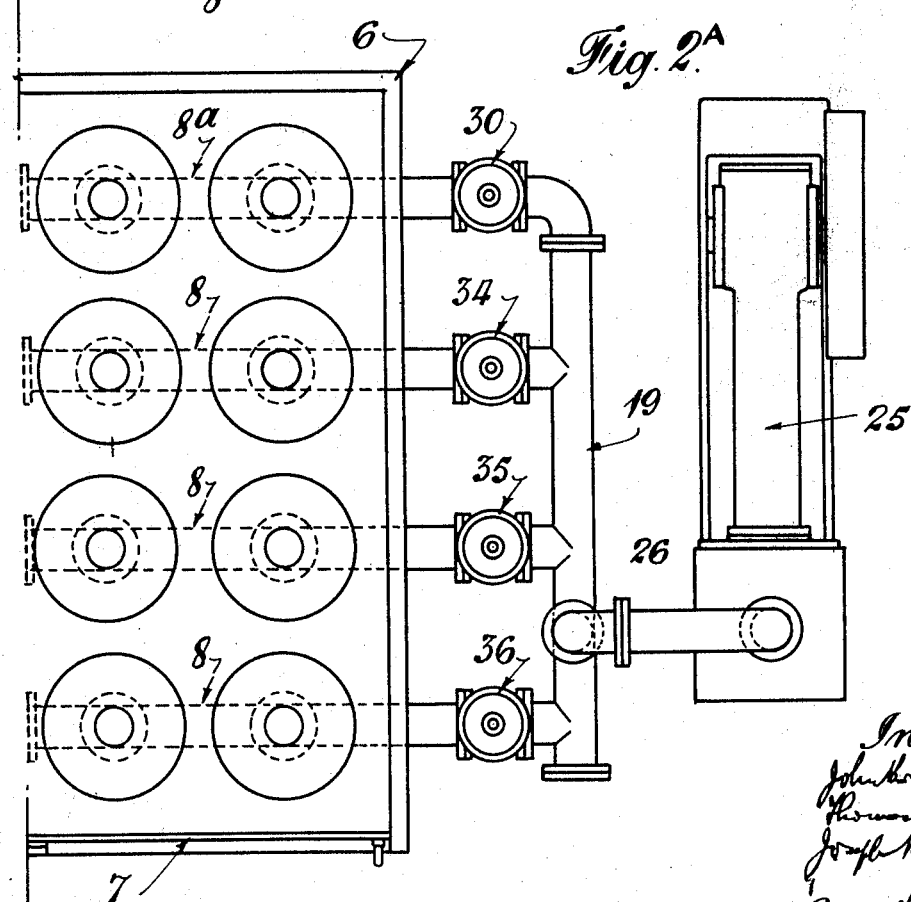

June 9, 1925. 1,540,926
J. BRANDWOOD ET AL
APPARATUS FOR THE DRYING OF WOUND YARNS AFTER LIQUID TREATMENT THEREOF
Filed May 18, 1923 6 Sheets-Sheet 1
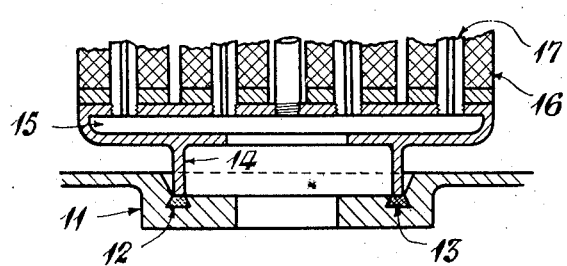
Fig. 3.
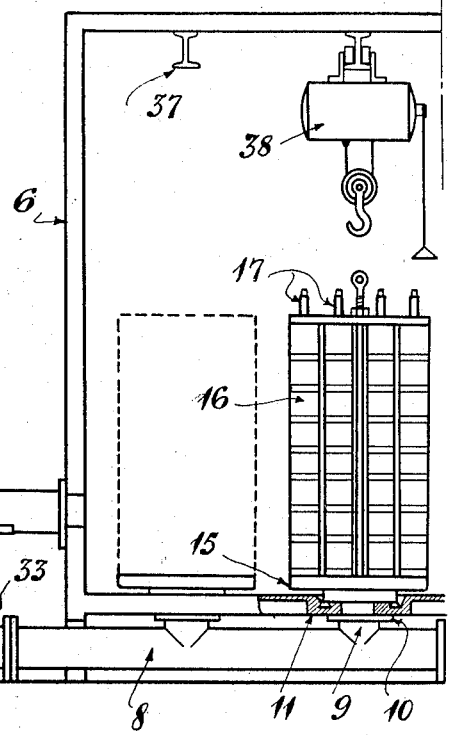
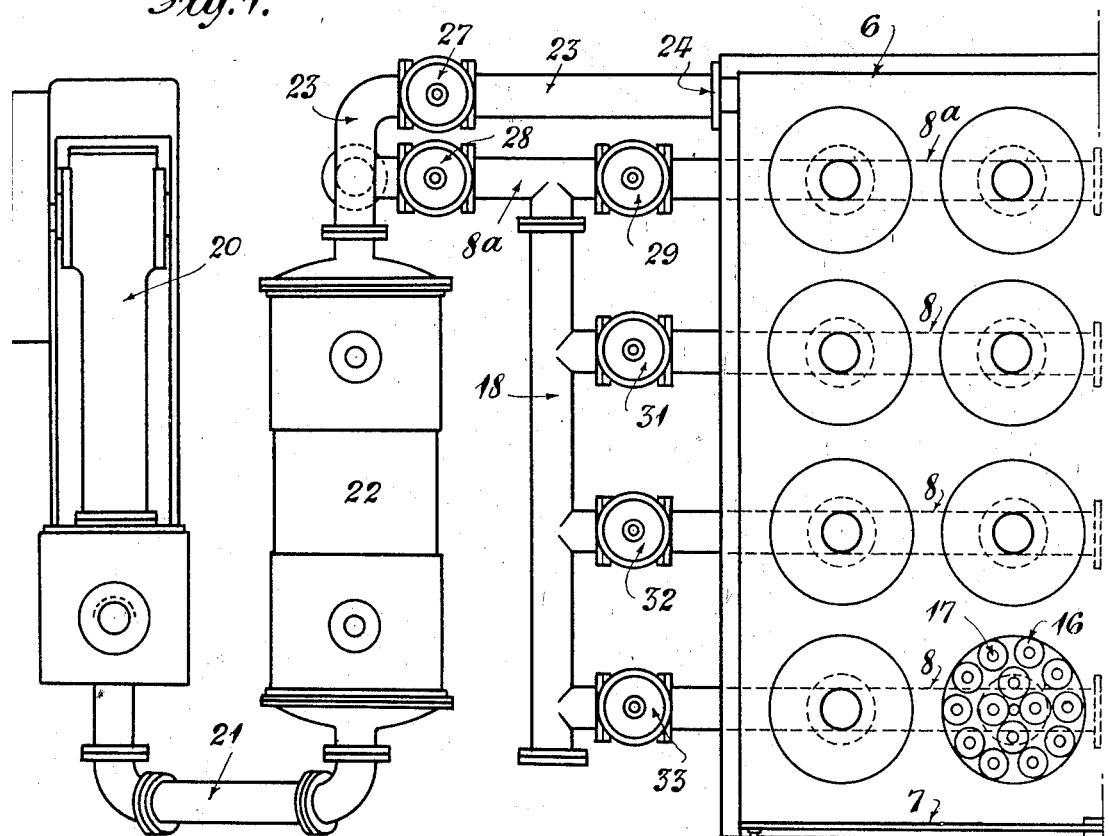
Fig. 1.
Fig. 2.
Inventors: John Brandwood, Thomas Brandwood, Joseph Brandwood
By their Attorney:

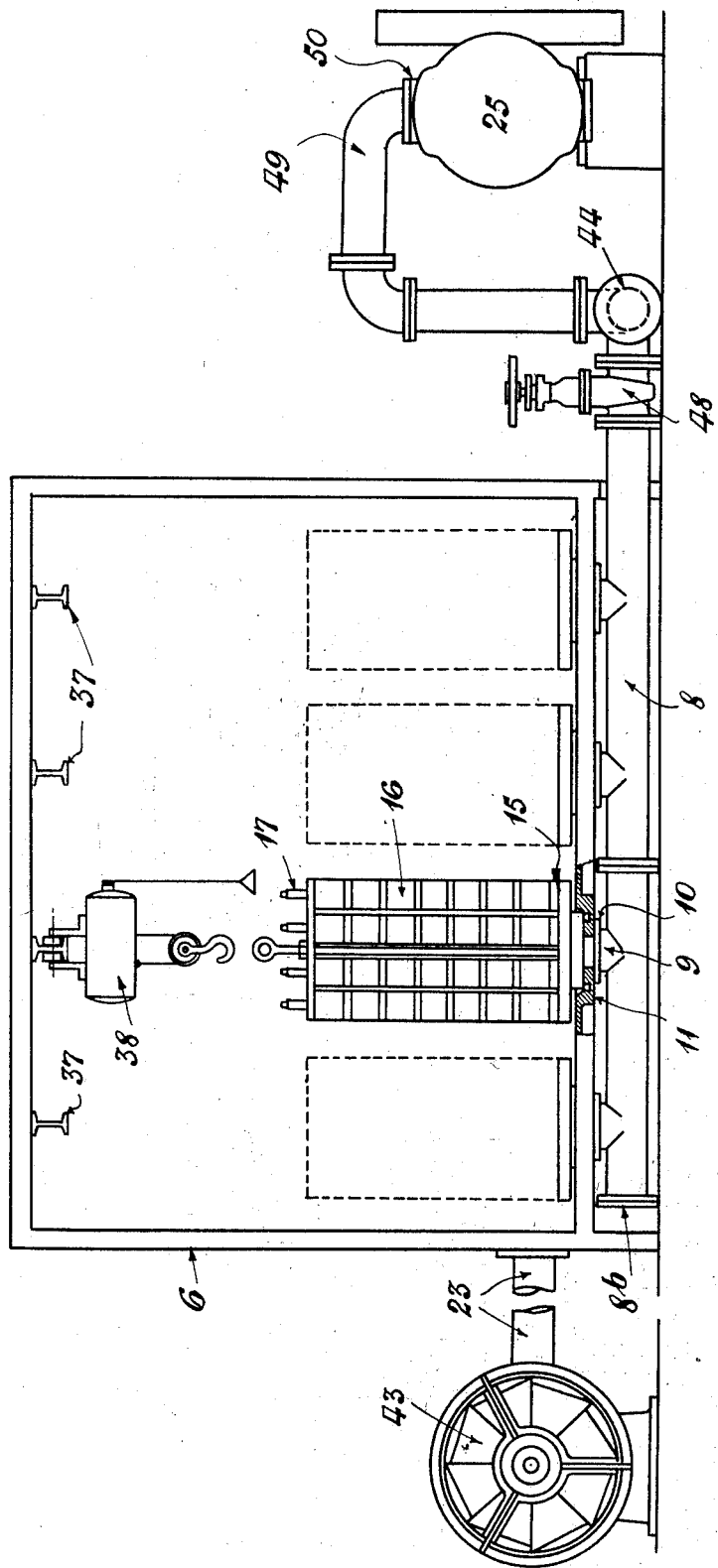

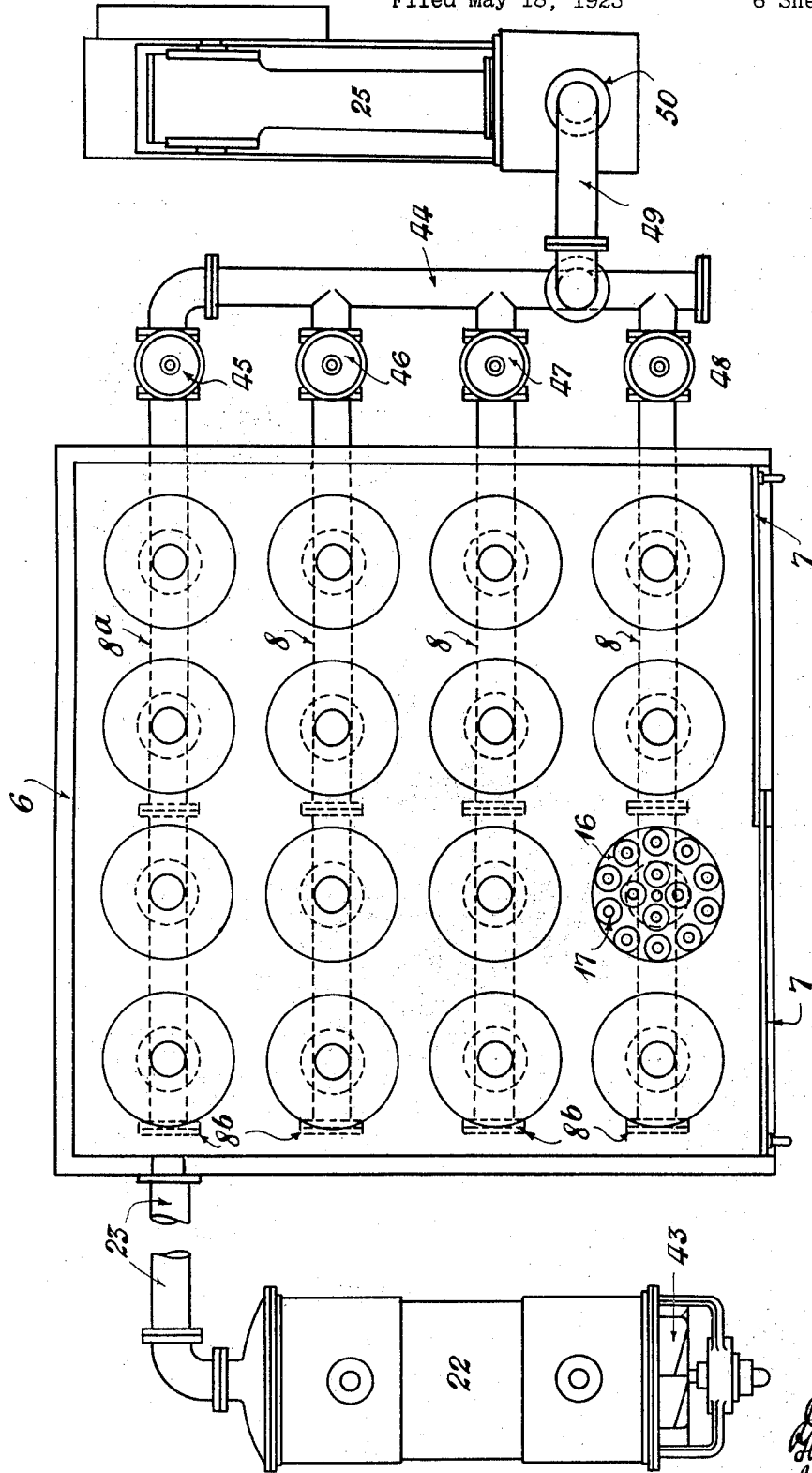

Patented June 9, 1925.

1,540,926

UNITED STATES PATENT OFFICE.

JOHN BRANDWOOD, THOMAS BRANDWOOD, AND JOSEPH BRANDWOOD, OF BURY, ENGLAND.

APPARATUS FOR THE DRYING OF WOUND YARNS AFTER LIQUID TREATMENT THEREOF.

Application filed May 18, 1923. Serial No. 639,908.

*To all whom it may concern:*

Be it known that we, JOHN BRANDWOOD, THOMAS BRANDWOOD, and JOSEPH BRANDWOOD, subjects of the King of Great Britain and Ireland, and residents of Elton, Bury, in the county of Lancaster, England, have invented a new or Improved Apparatus for the Drying of Wound Yarns After Liquid Treatment Thereof, of which the following is a specification.

In the drying of yarns wound in cheeses or other compact form as at present practiced the yarn packages are placed in drying chambers and heated air is blown into the said chambers by blowers or fans. The drying of the exterior of a yarn package is thus effected by contact with the heated air, and drying of the interior of same takes place by capillary attraction of the moisture within the package towards the exterior as the latter dries. The process has a tendency to bake the exterior of the packages, whilst the interior is not evenly dried, and further, in the case of dyed yarns, the exterior is dulled as a result of this baking. Much of the heated air does not come in contact with the yarn surfaces at all, and the process of drying indicated is therefore not economical.

The present invention relates to an apparatus for drying yarn wound in compact form which process will obviate the above disadvantages by forcing every particle of heated air employed to come into contact with the yarn to be dried, said heated air being forced or drawn through the yarn packages whilst the latter are in the form in which they were dyed. For this purpose, our invention contemplates the employment of vacuum air pumps and/or high pressure air pumps, a source of heated air, and means for ensuring that all the heated air shall pass rapidly through the yarn packages and in contact with and between the fibres composing the yarn.

In the drawings, Figs. 1 and 1<sup>A</sup> are a side view of an apparatus constructed according to this invention.

Figs. 2 and 2<sup>A</sup> are a plan view of the same.

Figure 4:
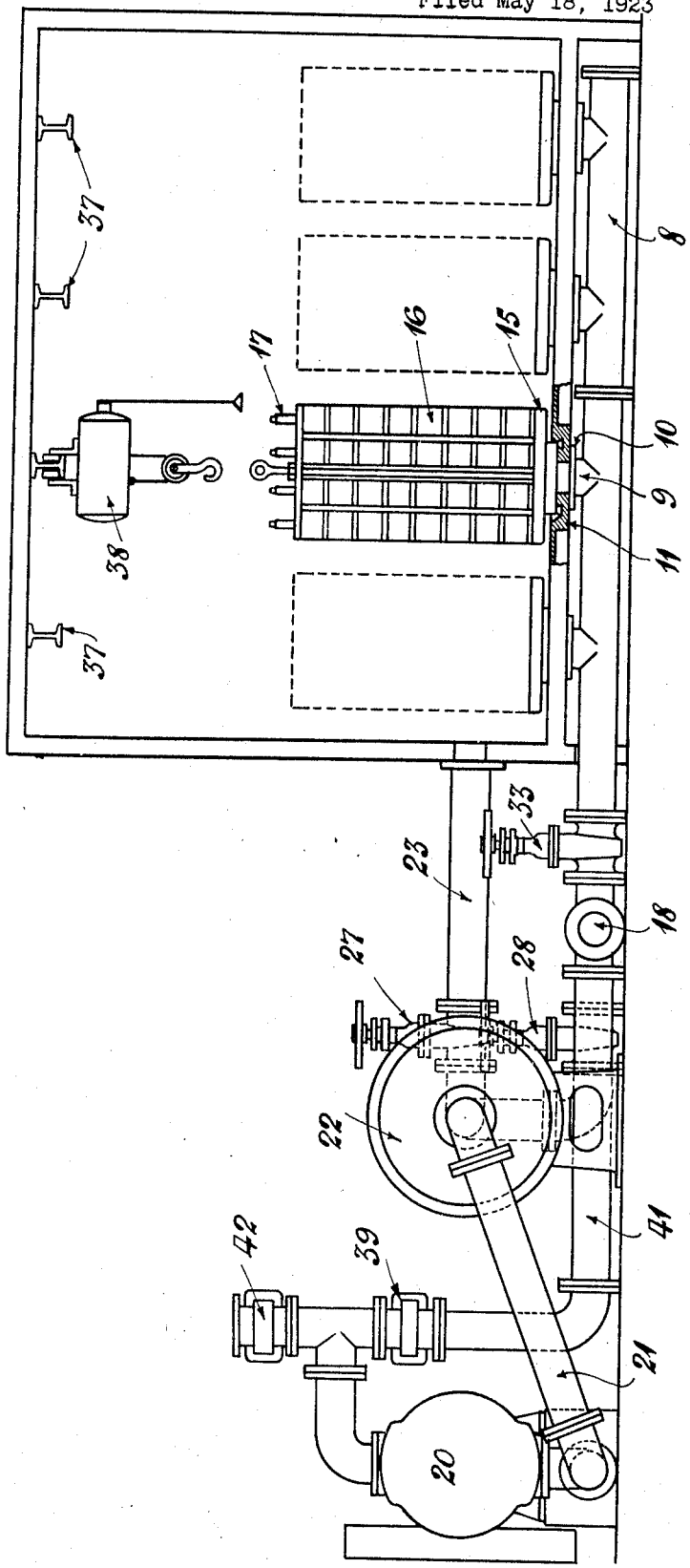
Figure 5:
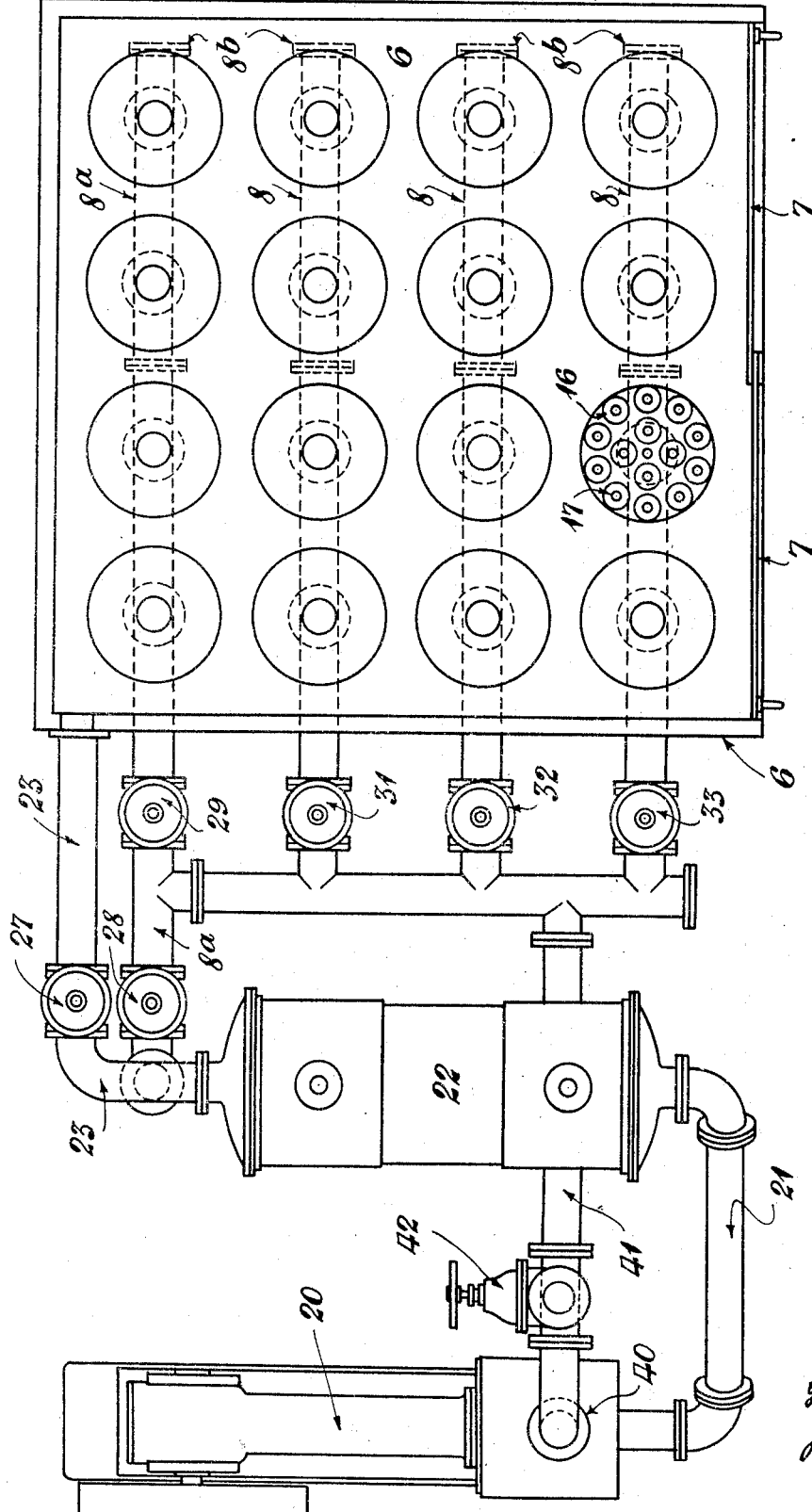

Figure 3 is a fragmentary section to an enlarged scale of a part of Figure 1;

Figures 4 and 5 are respectively elevation and plan of a modified form of construction of the drying arrangements shown in Figures 1 and 2, the vacuum pump of these figures being dispensed with; and Figures 6 and 7 show in elevation and plan respectively a further modification in which an air blower and vacuum pump are employed.

The arrangements shown in the drawings are for drying yarn in the form of cheeses after the latter have been dyed or otherwise treated in accordance with the specification to United States application Serial No. 500,584 filed the 14th. September, 1921. It will be understood however that any yarn package dyed on a perforated or analogous central spindle or cone by the passage therethrough of the dye liquor can be equally well dried by the process forming the subject matter of this present application.

Referring to Figures 1 and 2 of the drawings, 6 is a drying chamber which may be formed in any convenient manner, the walls being of metal or other material and having the sliding doors 7, 7. 8, 8<sup>a</sup> are pipes which are led through the chamber and each of which pipes has formed therein the branches 9 having flanges 10 to which are bolted or secured in any convenient manner the "dishes" 11. (The details of these dishes will be clearly seen on a reference to Figure 3.) In that figure a dish is shown as provided with annular recesses 12 in which is fitted a packing ring 13 of rubber or analogous material on which is bedded the edge of a tubular boss 14 which gives communication to a chamber 15 and thence to cheeses 16 mounted on spindles 17. The tubular boss, chamber, and the spindles on which the cheeses are mounted, are all as explained in specification to United States application Serial No. 500,584.

The drying chamber 6 arranged as shown in the drawings will receive sixteen carrier plates or containers each having its charge of cheeses, and each carrier plate is placed upon a dish 11 being maintained thereon by its own weight and making a tight joint therewith as shown in larger detail in the section Figure 3. Each pipe 8 and 8<sup>a</sup>, which passes through the drying chamber, and which by the mounting of the carrier plates upon the dishes 11 is now in communication with the cheeses 16, is extended beyond the walls of the drying chamber and opens into pipes 18, 19, placed on either side thereof as shown in Figure 2.

20 is an air pump which may be of any known type, and 21 a pipe which leads from the compression outlet of the pump to an air heater 22, which may also be of known type, and in which the air is heated and passes to a pipe 23 which enters the drying chamber 6 at 24. On the air pump 20 being operated therefore heated air is forced into the drying chamber. At the same time, a vacuum pump 25, also of any known type, is operating at the other side of the drying chamber, this vacuum pump being connected to pipe 19 by the pipe 26. 27 is a valve fitted upon the pipe 23; 28, 29, and 30, valves upon the pipe 8ª; 31, 32, 33, valves upon the other pipes 8 and opening or closing communication between these pipes and the pipes 18; and 34, 35, and 36 are valves upon these pipes 8 at the other side of the drying chamber and serving to open or close communication between the said pipes and the pipe 19.

The process of drying the cheeses by passing heated air therethrough in two directions, it being understood that each of the dishes 11 has placed upon it a carrier plate charged with cheeses on their perforated spindles 17 will now be described.

Valves 27, 30, 34, 35, and 36 are opened, and valves 28, 29, 31, 32 and 33 are closed.

The air and vacuum pumps 20 and 25 being started, air is compressed by the pump 20 to the air heater 22 thence through pipe 23 and valve 27 thereon to the interior of drying chamber 6. Whilst this is being effected, the vacuum pump 25 is, through the valves 30, 34, 35, 36 which are open, exhausting the air from the drying chamber, this exhaustion perforce taking place through the cheeses 16 on the carrier plates, the perforated spindles 17 on which they are mounted, and the chamber 15, through the dishes 11, into the pipes 8 and 8ª, through the valves 30, 34, 35, and 36 into pipe 19 and communicating pipe 26, and thence to the vacuum pump. Heated air is therefore forced in even and determined quantities into the drying chamber and withdrawn at the same rate through the cheeses 16, thus giving a rapid and even drying of the yarn of said cheeses from the exterior thereof and radially inwards therethrough.

When the above operation has been carried on for a sufficient period the flow of heated air through the cheeses may be reversed, and this is effected as follows:—

Valves 30, 34, 35, and 36 remain open, and valves 28, 29, 31, 32, and 33 are opened, valve 27 being closed. The air pump 20 being again put in operation heated air passes from the heater 22 through valves 28 and 29 to pipe 8ª, and through pipe 18 and valve 31, 32, and 33 to pipes 8, thence through branches 9 to the dishes 11 and chambers 15, through the spindles 17 and radially outward through the cheeses 16 into the drying chamber, whence it may escape to atmosphere. This may be accomplished by opening one of the sliding doors 7 a little way. In this operation the vacuum pump takes no part.

Handling arrangements for the carrier plates of cheeses may be arranged in any suitable manner within the drying chamber 6. In Figure 1 there are shown runways 37 each of which may have a hoisting tackle 38 of known type running thereon so that the said tackle may be brought over any of the dishes 11 in any particular row.

In Figures 4 and 5 is illustrated a modification of the apparatus shown in Figures 1 and 2, by which modification the vacuum pump may be dispensed with, whilst still retaining the advantages of a flow of heated air through the yarns to be dried in two directions. In these figures similar letters of reference refer to similar parts where they occur in Figures 1 and 2. In the operation of the drying apparatus according to this modification we proceed as follows:—

The valve 39 which is fitted upon a pipe 41 connecting the air inlet 40 of the air pump 20 with the pipe 18 is opened and valves 27, 29, 31, 32 and 33 are also open. Valve 28 is closed. The air pump 20 being started, air is forced thereby through the heater 22 and through the pipe 23 and valve 27 to the interior of drying chamber 6, whilst, the pipe 18 being connected to the air pump inlet 40 through pipe 41 a partial vacuum is set up in the said pipes. The air forced into the drying chamber is therefore drawn through the cheeses 16 and their perforated spindles 17 into pipes 8 and 8ª as explained with reference to the arrangement of Figures 1 and 2, thence into the pipe 18, and from said pipe 18 to the air pump inlet 40. A continuous flow of air is therefore maintained, such flow being radially through the cheeses from the exterior to the interior thereof, so long as the pump 20 is working and the valves are kept in the open and closed positions indicated above. In this case, the same volume of air is being circulated through the cheeses, and to counteract the defect of moist air being drawn therethrough the valve 42 on the pipe 41 (Figure 1) is kept open in a more or less degree as may be necessary or desirable, to atmosphere. Dry air is therefore drawn into the air pump 20 through this valve 42 in addition to and mixing with the air drawn from pipe 18 through the pipe 14 and the valve 39.

When it is desired to reverse the flow of air through the cheeses in the above modification, valves 27 and 39 are closed, valves 28, 29, 31, 32 and 33 being open, and air passing from the outlet of air pump 20 proceeds by pipe 21 to the heater 22, thence through valves 28 and 29, pipe 18, and valves 31, 32, and 33 and to the pipes 8 and 8ª and thus forced through the cheeses radially outwards to the interior of the drying chamber, whence it may escape to atmosphere.

It will be understood that in the methods of operation of the apparatus in the above modification any means for allowing the used air to escape from the drying chamber after passing radially outwards through the cheeses will be closed when the cheeses are being treated radially inwards with hot air forced into the chamber.

In Figures 6 and 7 is illustrated a modification wherein an air pressure pump is dispensed with, and an air blower or propeller used in conjunction with a vacuum pump, the apparatus being so arranged that heated air may be passed through the yarn packages in one direction by the suction of the vacuum pump. In the figures, 43 is an air propeller of any known type and of suitable capacity driven in any suitable and known manner and blowing air into the heater 22. The pipes 8ª and 8 open into a pipe 44, communication between the latter and any of the pipes 8ª and 8 being closable by means of the valves 45, 46, 47 and 48. In this modification the ends of the pipes within the drying chamber 6 are closed by closing flanges 8ᵇ. The pipe 44 is connected to the inlet 50 of vacuum pump 25 by a bent pipe 49.

Air is propelled into the heater 22 by the propeller or fan 43 and pass by way of pipe 23 into the drying chamber, whence it is drawn by the vacuum pump 25 in the manner described with reference to a previously described modification, and expelled to atmosphere.

In all the modifications, any pipe 8, or 8ª, may be closed by means of the valves placed thereon and exteriorly of the drying chamber, when that particular pipe is not being used.

It will be understood that in all cases where it is found sufficient, heater air may be passed through the yarn packages in one direction only, either by pressure or suction. In the case of cops mounted on perforated spindles it will be found that pressure or suction of heated air therethrough in one direction will give a rapid and sufficient drying.

After yarn packages are dried by the above process they may be conditioned by the pressing and/or suction therethrough of air at ordinary temperature by the same apparatus. This involves merely the cutting out of the heater, and passing the air into the drying chamber or into pipes 8ª and 8 direct from the pressure or vacuum pump as the case may be by means, which, as they will be well understood, need not be described or illustrated.

The temperature of the air to be employed may be any suitable, 200 degrees F. being a convenient figure for the purpose. The capacity of the air pump 20 and the vacuum pump 25 when the latter is employed, will be proportioned so that an even flow of air is maintained through the yarns, as will also the capacity of a blower when used, and of the vacuum pump, so that drying may be carried on with a minimum of waste of heated air.

A satisfactory maximum pump pressure for all practical purposes—and its equivalent vacuum—is 8–9 lbs. to the square inch. But where pressure only is employed the said pressure may be exerted up to the maximum of the air pump.

We claim:—

1. A drying apparatus, comprising a drying chamber, an air pipe communicating directly with the air space of the said chamber, a support arranged horizontally in the said chamber and provided with a dish having an air opening, an air pipe connected to said dish, a hollow carrier plate provided with perforated tubes for supporting cheeses of yarn and having a tubular stem which engages with the said dish, and means for forcing air into one of the air pipes and for exhausting air from the other air pipe.

2. A drying apparatus as set forth in claim 1, provided with means for heating the air before it enters the air pipe into which it is forced.

3. A drying apparatus, comprising a drying chamber, an air pipe communicating directly with the air space of the said chamber, a support arranged horizontally in the said chamber and provided with dishes arranged in rows and having air openings, a series of air pipes extending through the chamber and each provided with branches for connecting it with a row of dishes, hollow carrier plates provided with perforated tubes for supporting cheeses of yarn and having tubular stems which engage with the said dishes, means for exhausting air from one end of the series of pipes, and means for forcing air into the other end of the series of pipes and also into the first said pipe.

4. A drying apparatus, comprising a drying chamber, an inlet pipe communicating directly with the air space of the said chamber and provided with a stop valve, an inlet manifold at one end of the chamber also provided with a stop valve, an outlet manifold at the other end of the chamber, a support arranged horizontally in the chamber and provided with dishes arranged in rows and having air openings, a series of air pipes extending through the chamber and connecting the two manifolds, each pipe of said series having branches for connecting it to a row of dishes and having a stop valve at each end, hollow carrier plates provided with perforated tubes for supporting cheeses of yarn and having tubular stems which engage with the said dishes, means for exhausting air from the outlet manifold, and means for forcing air into the inlet manifold and also into the first said air pipe.

In testimony whereof we have hereunto set our hands.

JOHN BRANDWOOD.
THOMAS BRANDWOOD.
JOSEPH BRANDWOOD.